US008622070B2

(12) United States Patent
Simpson et al.

(10) Patent No.: US 8,622,070 B2
(45) Date of Patent: Jan. 7, 2014

(54) VALVE RELEASE MECHANISM

(75) Inventors: Gregory D. Simpson, Goleta, CA (US); Dennis L. Linhares, Goleta, CA (US); Kenneth William Murray, Goleta, CA (US); Joday L. Gardner, Oxnard, CA (US)

(73) Assignee: Kidde Technologies, Inc., Wilson, NC (US)

( * ) Notice: Subject to any disclaimer, the term of this patent is extended or adjusted under 35 U.S.C. 154(b) by 438 days.

(21) Appl. No.: 12/987,443

(22) Filed: Jan. 10, 2011

(65) Prior Publication Data
US 2012/0175543 A1    Jul. 12, 2012

(51) Int. Cl.
*F16K 17/00* (2006.01)
*F16K 17/40* (2006.01)

(52) U.S. Cl.
USPC ............... 137/68.13; 137/71; 251/66; 251/73

(58) Field of Classification Search
USPC .............................. 137/68.13, 71; 251/66, 73
See application file for complete search history.

(56) References Cited

U.S. PATENT DOCUMENTS

| | | | |
|---|---|---|---|
| 2,717,042 A * | 9/1955 | Grant, Jr. et al. | 137/68.13 |
| 2,950,022 A * | 8/1960 | Boyer | 137/72 |
| 3,001,586 A * | 9/1961 | Kyle | 251/66 |
| 3,049,868 A * | 8/1962 | Adams, Jr. et al. | 137/68.13 |
| 3,766,803 A * | 10/1973 | Ball et al. | 137/68.13 |
| 3,802,459 A * | 4/1974 | Geraudie | 251/66 |
| 4,289,039 A * | 9/1981 | Trunner et al. | 251/66 |
| 4,579,315 A | 4/1986 | Kowalski | |
| 4,688,592 A * | 8/1987 | Tibbals, Jr. | 251/66 |
| 4,827,963 A * | 5/1989 | Baker et al. | 137/75 |
| 5,067,510 A * | 11/1991 | Breaux et al. | 137/75 |
| 5,947,143 A * | 9/1999 | Moakes et al. | 137/68.13 |
| 6,321,770 B1 * | 11/2001 | Hintzman et al. | 137/71 |
| 7,150,287 B2 * | 12/2006 | Kita et al. | 137/72 |

* cited by examiner

*Primary Examiner* — John Rivell
(74) *Attorney, Agent, or Firm* — Kinney & Lange, P.A.

(57) ABSTRACT

A valve release mechanism has an actuator, a ring, a plurality of ball bearings, and a retainer. The retainer is positioned adjacent an inner diameter of the ring and has a plurality of circumferentially spaced holes therein. Each circumferentially spaced hole receives one of the plurality of ball bearings, which are movable therein. The ring has channels and lands along its inner diameter that allow the ball bearings to move varying distances relative to the retainer. The lands contact the ball bearings when the ring is in a first position and the channels receive the ball bearings when the ring is in a second position. The poppet has a groove that is vertically aligned with circumferentially spaced holes in the retainer when the poppet is in a first closed position. The ball bearings are pressed into the groove in the poppet by the lands of the ring. The resulting interference of the ball bearings with poppet locks the poppet in the first closed position. The ring can be moved from the first closed position to a second position by the actuator.

17 Claims, 3 Drawing Sheets

VALVE RELEASE MECHANISM

BACKGROUND

The present invention relates to valves, and more particularly, to a valve release mechanism with improved discharge performance for fire suppression and other high mass flow applications.

High speed and high mass flow valve release mechanisms operate to rapidly open valves for fire suppression and other applications. For fire suppression, high speed valves allow pressurized gas to be released to suppress a fast developing fires or explosions. To achieve rapid valve opening, conventional high speed valves commonly use a large solenoid driven at high current (generally greater than 10 amps). Additionally, several components such as a collet that restrains a poppet must be fabricated to exacting tolerances and placed with precise separations relative to other components to allow for rapid opening of the valve. To achieve such precise separation of components, several critical manual adjustments must be performed during manufacture. Considering the above requirements, conventional high speed valves are expensive to manufacture and can be bulky.

SUMMARY

A valve release mechanism has an actuator, a ring, a plurality of ball bearings, and a retainer. The retainer is positioned adjacent an inner diameter of the ring and has a plurality of circumferentially spaced holes therein. Each circumferentially spaced hole receives one of the plurality of ball bearings, which are movable therein. The ring has channels and lands along its inner diameter that allow the ball bearings to move varying distances relative to the retainer. The lands contact the ball bearings when the ring is in a first position and the channels receive the ball bearings when the ring is in a second position. The poppet has a groove that is vertically aligned with circumferentially spaced holes in the retainer when the poppet is in a first closed position. The ball bearings are pressed into the groove in the poppet by the lands of the ring. The resulting interference of the ball bearings with poppet locks the poppet in the first closed position. The ring can be moved from the first closed position to a second position by the actuator.

DETAILED DESCRIPTION

Figure 1:
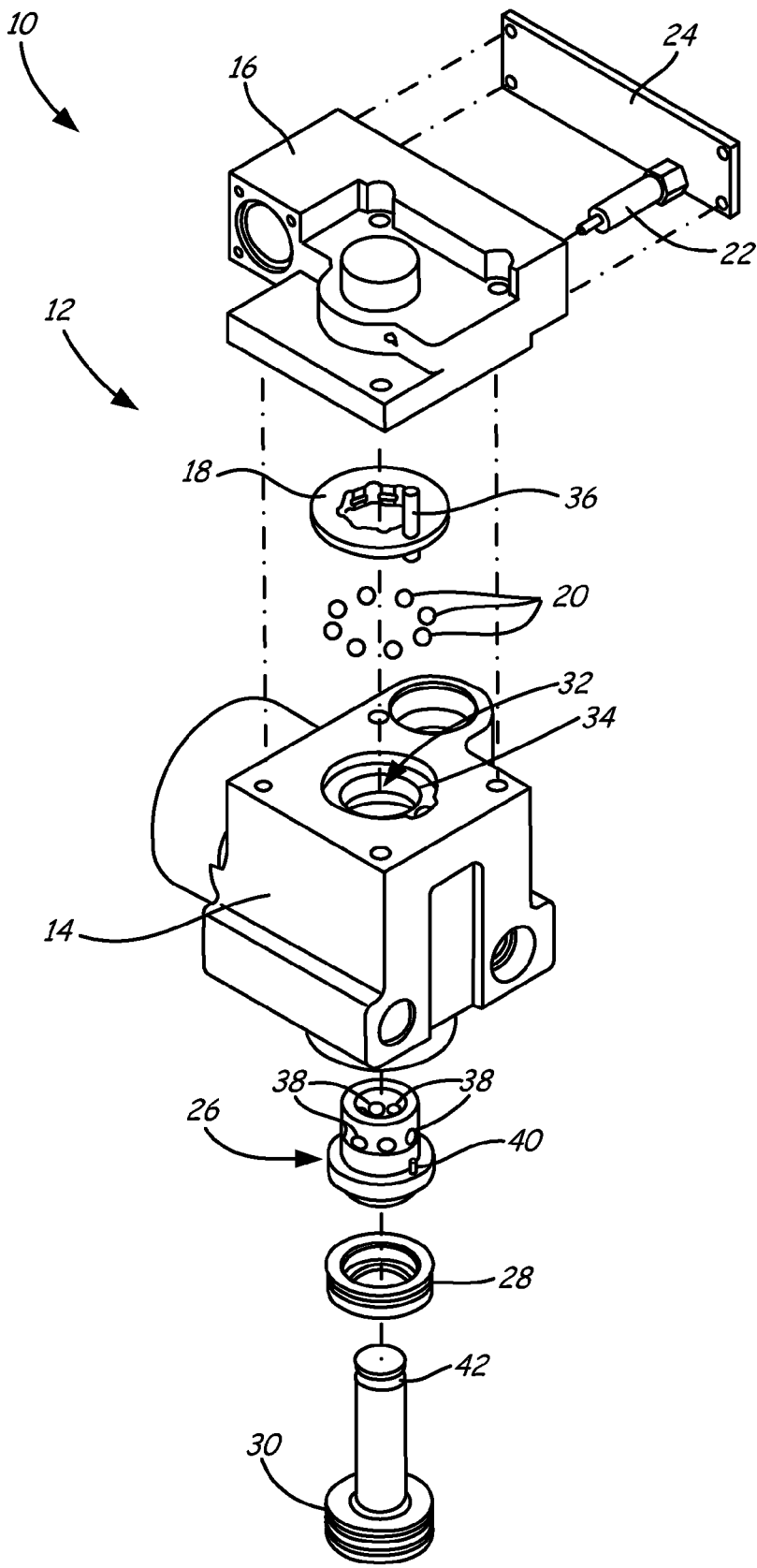
FIG. 1 is an exploded view of one embodiment of a high speed valve.

FIG. 1 shows an exploded view of one embodiment of a high speed valve 10. The valve 10 includes a valve body 12 that has a main body 14 and a cover 16. Valve 10 also includes a ring 18, ball bearings 20, actuator 22, a lid 24, a retainer 26, a bumper 28 and a poppet 30. Main body 14 includes an aperture 32 and a circumferential groove 34. Ring 18 includes an actuation pin 36. Retainer 26 includes holes 38 and indexing pin 40. Poppet 30 includes a groove 42.

As illustrated in FIG. 1, valve body 12 of high speed valve 10 comprises main body 14 and cover 16. Cover 16 is fastened to main body 14 to enclose ring 18 and ball bearings 20 and other components therebetween. Ring 18 rests on main body 14 and is free to rotate through a predetermined angle relative to main body 14 and cover 16 when actuated. Similarly, ball bearings 20 are capable of movement via contact with ring 18. Ball bearings 20 move radially and axially relative to axis of symmetry of main body 14 and cover 16. Actuator 22 is disposed within cover 16 and enclosed by lid 24. Actuator 22 is disposed adjacent ring 18 so as to make contact with pin 36 when actuated.

Retainer 26 is disposed within main body 14 and a portion of retainer 26 extends upward from main body 14 into cover 16. Retainer 26 is disposed radially inward of ring 18. Ring 18 is capable of rotation with respect to retainer 26. Bumper 28 contacts an inner portion of retainer 26 within the main body 14. Retainer 26 and bumper 28 are adapted with apertures to receive poppet 30. Poppet 30 is able to translate linearly with respect to the retainer 26, bumper 28 and main body 14 to restrict the flow of fluid through a flow passage (not shown) of main body 14.

Poppet 30 is received by apertures in retainer 26 and bumper 28 and by aperture 32 in main body 14. The upper portion of poppet 30 extends from the aperture 32 and is received in a corresponding aperture (not shown) in cover 16. Circumferential groove 34 extends into the upper portion of main body 14 around aperture 32. Circumferential groove 34 receives a lower lip portion of ring 18, which rides therein. Actuator pin 36 extends from ring 18 in both upward and downward directions parallel to poppet 30 and is received in slots (not shown) in main body 14 and cover 16. Actuator pin 36 is disposed adjacent actuator 22 such that it can be contacted thereby when actuator 22 is actuated.

Retainer 26 includes a plurality of holes 38 spaced around the circumference thereof and indexing pin 40. As will be discussed subsequently, indexing pin 40 is received in a clocking hole (not shown) in main body 14 to align the plurality of holes 38 relative to ring 18. The plurality of holes 38 receive ball bearings 20 therein and allow ball bearings 20 to move to contact either ring 18 alone or to simultaneously contact ring 18 and poppet 30 when poppet 30 is in a first closed position blocking flow through the flow passage (not shown) of main body 14. In particular, when poppet 30 is in the first closed position, circumferential groove 42 is vertically aligned with the plurality of holes 38 in retainer 26. Ball bearings 20 are pressed into groove 42 by portions of the inner diameter of ring 18. The resulting interference of the ball bearings 20 with poppet 30 locks poppet 30 in the first closed position.

Figure 2A:
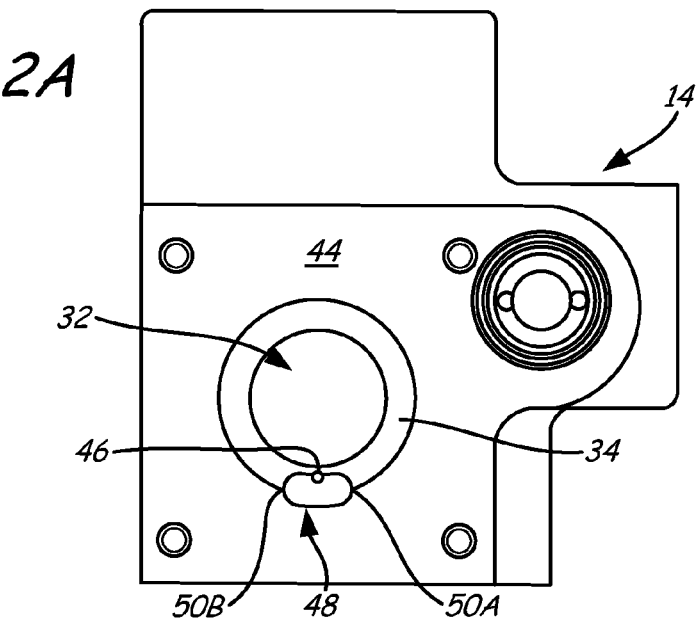
FIG. 2A is a view of a top of a main body of the high speed valve illustrating a slot disposed about a receiving aperture.
Figure 2B:
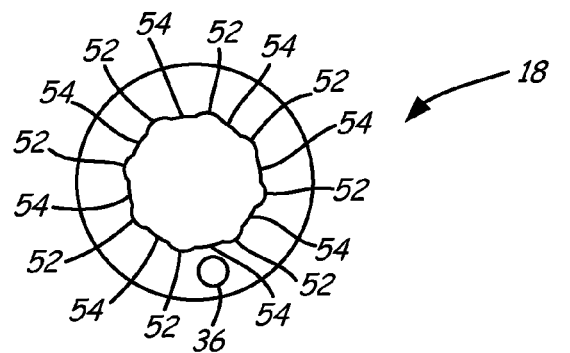
FIG. 2B is a view of a top of an actuator ring with an actuating pin.
Figure 2C:
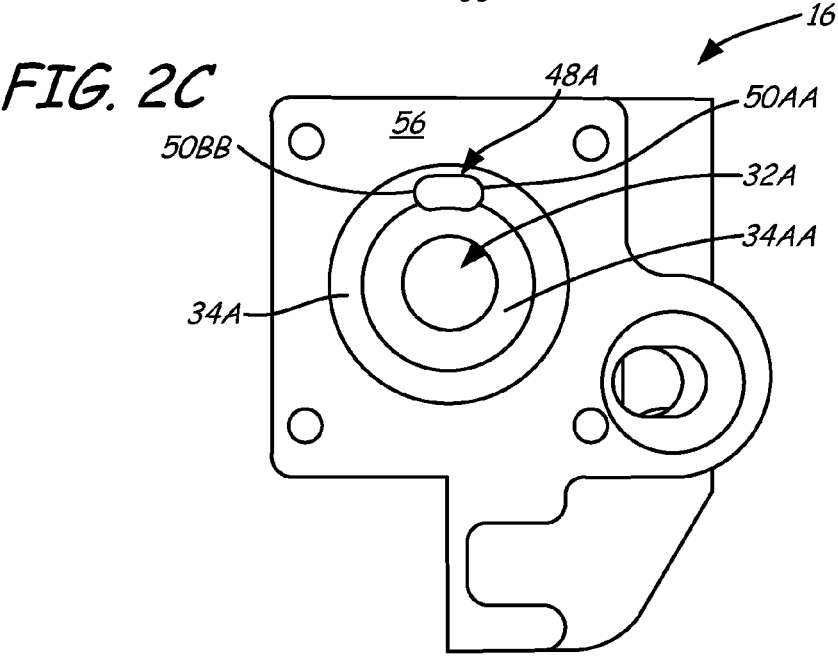
FIG. 2C is a view of a bottom of a cover of the high speed valve illustrating a slot disposed adjacent a receiving aperture.

FIGS. 2A-2C show views of the main body 14, cover 16 and ring 18. FIG. 2A shows the top of main body 14. In addition to aperture 32 and circumferential groove 34, main body 14 includes an upper surface 44, a clocking hole 46 and a slot 48 with stops 50A and 50B. FIG. 2B shows ring 18 with actuator pin 36 and channels 52 and lands 54. FIG. 2C shows the bottom of cover 16 which includes a bottom surface 56, an aperture 32A, circumferential grooves 34A and 34AA, and a slot 48A with stops 50AA and 50BB.

As shown in FIG. 2A, aperture 32 extends vertically through main body 14 and receives retainer 26 (FIG. 1) therein. Although not required in all embodiments, optional circumferential groove 34 extends around aperture 32 and is sized to receive the lower lip portion of ring 18. The bottom of circumferential groove 34 is disposed below upper surface 44. Upper surface 44 interfaces with cover 16. Clocking hole 46 extends vertically upward adjacent aperture 32 from an inner portion of main body 14 into slot 48. Clocking hole 46 receives indexing pin 40 (FIG. 1) of retainer 26 (FIG. 1) therein. Slot 48 is sized to receive the lower portion of actuator pin 36 and allow for travel of actuator pin 36. Slot 48 extends below circumferential groove 34 to a depth that enables actuator pin 36 to be received therein. The length of slot 48 can vary from embodiment to embodiment enabling greater or decreased rotation of ring 18 between a first position and a second position. When the ring 18 is in the first position a portion of actuator pin 36 contacts stop 50A. When ring 18 is actuated, actuator pin 36 travels along slot 48 to contact stop 50B in the second position.

In the embodiment shown, actuator pin 36 extends both vertically upward and downward parallel to the axis of symmetry of ring 18. Ring 18 is sized so that the inner diameter thereof is disposed about retainer 26 (FIG. 1) and poppet 30 (FIG. 1). The inner diameter has an array of channels 52 and lands 54 interposed thereon. Channels 52 are sized to act as detents to receive ball bearings 20 when ring 18 is actuated to the second position. Lands 54 are spaced between channels 52 and project radially further inward toward the axis of symmetry of ring 18 than channels 52. When the ring 18 is in the first position, lands 54 contact ball bearings 20 to press ball bearings 20 into interference with poppet 30 (FIG. 1).

Bottom surface 56 of cover 16 is illustrated in FIG. 2C. Bottom surface 56 interfaces with upper surface 44 of main body 14. Aperture 32A extends into cover 16 and interfaces with aperture 32 in main body 14 (FIG. 2A). Aperture 32A receives the upper portion of poppet 30 (FIG. 1) and has sufficient depth to allow poppet 30 to move from the first closed position to the second position. Optional circumferential grooves 34A and 34AA extend inward from bottom surface 56 at varying distances. Circumferential groove 34A receives an upper portion of ring 18, while groove 34AA receives an upper portion of retainer 26 (FIG. 1) allowing those components to be disposed between the main body 14 and cover 16. Slot 48A extends to a greater depth than circumferential groove 34AA. This depth enables the upward extending portion of actuator pin 36 (FIG. 2B) to be received therein. Like slot 48, the length of slot 48A can vary from embodiment to embodiment enabling greater or decreased rotation of ring 18 between the first position and the second position depending on the number of ball bearings 20 (FIG. 1). More particularly, when the ring 18 is in the first position a portion of actuator pin 36 contacts stop 50AA. When ring 18 is actuated, actuator pin 36 travels along slot 48A to contact stop 50BB in the second position. The embodiment of high speed valve 10 shown in the FIGURES includes stops 50A, 50B, 50AA, and 50BB on the main body 14 and cover 16, in other embodiments a single stop or multiple stops can be used on only one of the main body 14 or cover 16.

Figure 3A:
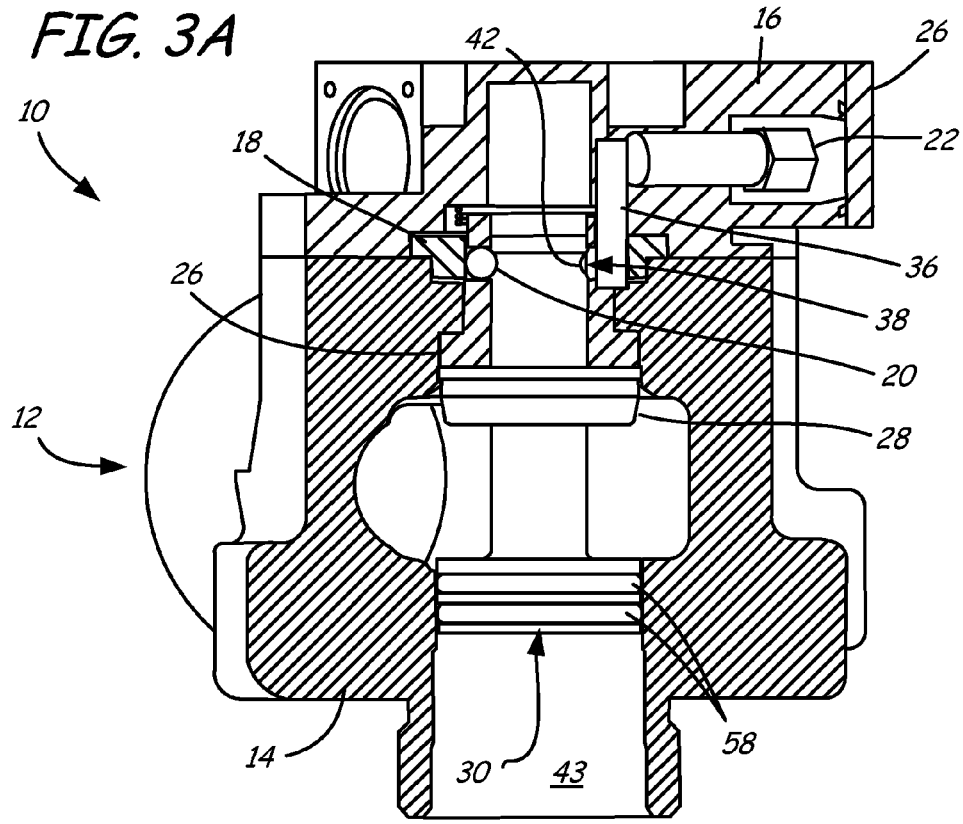
FIG. 3A is a sectional view of the high speed valve with a poppet in a first closed position.
Figure 3B:
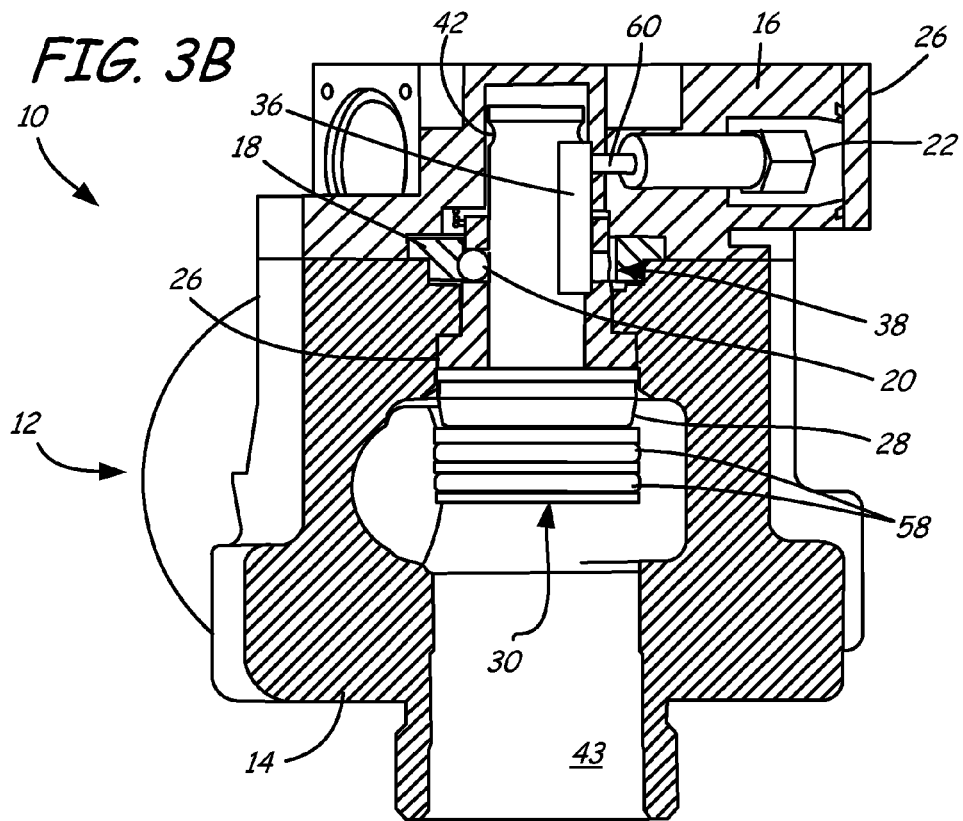
FIG. 3B is a sectional view of the high speed valve with the poppet in a second open position.

FIGS. 3A and 3B illustrate high speed valve 10 assembled and in the first closed position and a second open position. FIG. 3A shows high speed valve 10 with poppet 30 in the first closed position blocking flow through flow passage 43. The piston portion of poppet 30 can include one or more gaskets 58 that interface with the sides of flow passage 43 to provide for better sealing. As shown in FIG. 3A, poppet 30 is positioned so that circumferential groove 42 is vertically aligned with the plurality of holes 38 in retainer 26. Ball bearings 20 (only one is illustrated in FIG. 3A) are pressed into groove 42 by lands 54 (FIG. 2B) on the inner diameter of ring 18. The resulting interference of the ball bearings 20 with poppet 30 locks poppet 30 in the first closed position.

Lands 54 are aligned to interface with the plurality of holes 38 and contact ball bearings 20 by locating ring 18 precisely relative to retainer 26. In particular, indexing pin 40 (FIG. 1) is received in clocking hole 46 (FIG. 2A) upon installation of retainer 26 about poppet 30 in main body 14. Indexing pin 40 acts to fix retainer 26 with holes 38 in a stationary position relative ring 18. Ring 18 is located in the first predetermined position adjacent actuator 22 with lands 54 aligned to interface the plurality of holes 38 by stops 50A and 50AA on the main body 14 and cover 16, respectively. In particular, in the first position actuator pin 36 contacts stops 50A and 50AA to position ring 18.

In one embodiment, actuator 22 comprises a pyrotechnic piston actuator as is known in the art. Upon electrical actuation, the pyrotechnic piston actuator undergoes a controlled explosion to quickly extend a piston 60 at high velocity to contact actuator pin 36 and drive ring 18 from the first position to the second position.

As shown in FIG. 3B, piston 60 drives actuator pin 36 along slots 48 and 48A (FIGS. 2A and 2C) to contact stops 50B and 50BB in the second position. Slots 48 and 48A are sized so as to allow ring 18 to travel a predetermined angle of rotation to align channels 52 (FIG. 2B) to interface with the plurality of holes 38 and receive ball bearings 20 therein. The predetermined angle may very from embodiment to embodiment. In particular, with lands 54 (FIG. 2B) removed from contact with ball bearings 20 in the second position, ball bearings 20 are moved out of interference with poppet 30 by pressure within flow passage 43 from pressurized container. This pressure forces poppet 30 upward vertically, which ramps ball bearings 20 downward out of contact with poppet 30 through the plurality of holes 38 into channels 52.

Compared with conventional high speed valves, high speed valve 10 disclosed herein maintains important design criteria such valve opening time but has a reduced part count and reduced size and weight. High speed valve 10 eliminates the need for manual adjustment during manufacture associated with the prior art. Additionally, features such as the indexing pin 40 and stops 50A, 50B, 50AA, and 50BB reduce the chances of assembly error and increase reliability of valve 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A valve release mechanism, comprising:
an actuator including a pyrotechnic piston actuator;
a ring having channels and lands along an inner diameter thereof, the ring movable from a first position to a second position by the actuator; and
a plurality of ball bearings, each ball bearing is contacted by one of the lands when the ring is in the first position and received in one of the channels when the ring moved to the second position.
2. The valve release mechanism of claim 1, wherein the ring includes an actuating pin that is contacted by the actuator to move the ring from the first position to the second position.

3. The valve release mechanism of claim 1, further comprising a retainer disposed adjacent an inner diameter of the ring, the retainer has a plurality of circumferentially spaced holes that receive the plurality of ball bearings therein.

4. The valve release mechanism of claim 3, further comprising:
a valve body having a flow passage therethrough and including at least one stop; and
a poppet disposed within the valve body and extending through the retainer, the poppet movable between a first position in which the poppet blocks the flow passage and a second position, the poppet including a circumferential groove therein.

5. The valve release mechanism of claim 4, wherein the retainer is disposed about the poppet such that the groove is aligned with the plurality of circumferentially spaced holes in the retainer and the ball bearings are pressed into the groove in the poppet by the lands when the ring is in the first position.

6. The valve release mechanism of claim 4, wherein when the ring is moved to the second position by the actuator the channels in the ring interface with the plurality of holes in the retainer allowing the ball bearings to move out of interference with the poppet and be received in the channels in the ring.

7. The valve release mechanism of claim 4, wherein the retainer has an indexing pin that is received in a clocking hole in the valve body to align the plurality of holes in the retainer relative to the ring such that when the ring is in the first position the lands interface with the plurality of holes in the retainer and when the ring is in the second position the channels in the ring interface with the plurality of holes in the retainer.

8. The valve release mechanism of claim 7, wherein the valve body includes a cover and a main body and both the cover and main body include stops that are both contacted by an actuator pin of the ring when the ring is moved to the second position.

9. A high speed valve, comprising:
a valve body having a flow passage therethrough;
a poppet disposed within the valve body, the poppet movable between a first position in which the poppet blocks the flow passage and a second position;
a pyrotechnic piston actuator positioned adjacent the poppet within the valve body;
a ring having channels and lands along an inner diameter thereof, the ring movable from a first position to a second position by the actuator; and
a plurality of ball bearings, each ball bearing is contacted by one of the lands when the ring is in the first position so as to move into interference with the poppet and thereby maintain the poppet in the first position blocking the flow passage.

10. The high speed valve of claim 9, wherein the plurality of ball bearings are received in the channels when the ring moved to the second position.

11. The high speed valve of claim 9, further comprising a retainer disposed between the ring and the poppet, the retainer has a plurality of circumferentially spaced holes that receive the plurality of ball bearings therein, and wherein the retainer has an indexing pin that is received in a clocking hole in the valve body to align the plurality of holes in the retainer relative to the ring such that when the ring is in the first position the lands interface with the plurality of holes in the retainer and when the ring is in the second position the channels in the ring interface with the plurality of holes in the retainer.

12. The high speed valve of claim 9, wherein the ring includes an actuating pin that is contacted by the actuator to move the ring from the first position to the second position, and wherein the actuating pin contacts at least one stop on the valve body when the ring is in the second position.

13. The high speed valve of claim 12, wherein the valve body has a cover and a main body, the main body has a circumferential groove about the poppet that receives the ring, one or both of the cover and main body has a slot that receives the actuating pin to allow for rotation of the ring between the first position and the second position.

14. A valve release mechanism, comprising:
a ring having channels and lands along an inner diameter thereof, the ring movable from a first position to a second position;
a retainer disposed adjacent an inner diameter of the ring, the retainer has a plurality of circumferentially spaced holes therein; and
a plurality of ball bearings, each ball bearing movably disposed in one of the plurality of circumferentially spaced holes and contacted by one of the lands when the ring is in the first position and received in one of the channels when the ring moved to the second position;
wherein the retainer has an indexing pin that is received in a clocking hole in the valve body to align the plurality of holes in the retainer relative to the ring such that when the ring is in the first position the lands interface with the plurality of holes in the retainer and when the ring is in the second position the channels in the ring interface with the plurality of holes in the retainer.

15. The valve release mechanism of claim 14, further comprising:
a valve body having a flow passage therethrough and including at least one stop; and
a poppet disposed within the valve body and extending through the retainer, the poppet movable between a first position in which the poppet blocks the flow passage and a second position, the poppet including a circumferential groove therein.

16. The valve release mechanism of claim 15, wherein the retainer is disposed about the poppet such that the groove is aligned with the plurality of circumferentially spaced holes in the retainer and the ball bearings are pressed into the groove in the poppet by the lands when the ring is in the first position.

17. The valve release mechanism of claim 15, wherein when the ring is moved to the second position by the actuator the channels in the ring interface with the plurality of holes in the retainer allowing the ball bearings to move out of interference with the poppet and be received in the channels in the ring.

\* \* \* \* \*